US012459327B2

(12) United States Patent
Bartolone et al.

(10) Patent No.: US 12,459,327 B2
(45) Date of Patent: *Nov. 4, 2025

(54) VARIABLE RATE LIQUID SPRING SUSPENSION SYSTEM EXHIBITING LOW VARIANCE IN SUSPENSION FREQUENCY

(71) Applicant: LIQUIDSPRING TECHNOLOGIES, INC., Santa Fe Springs, CA (US)

(72) Inventors: Dean F. Bartolone, Lafayette, IN (US); David L. Nagreski, Lafayette, IN (US); Carl D. Harr, McAlpin, FL (US); Aaron Gebhardt, Logansport, IN (US)

(73) Assignee: LIQUIDSPRING TECHNOLOGIES, INC., Santa Fe Springs, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/036,808

(22) Filed: Jan. 24, 2025

(65) Prior Publication Data
US 2025/0170867 A1 May 29, 2025

Related U.S. Application Data

(63) Continuation of application No. 18/334,878, filed on Jun. 14, 2023, which is a continuation of application
(Continued)

(51) Int. Cl.
*B60G 17/04* (2006.01)
*B60G 17/056* (2006.01)

(52) U.S. Cl.
CPC ....... *B60G 17/0424* (2013.01); *B60G 17/056* (2013.01); *B60G 2202/154* (2013.01); *B60G 2400/60* (2013.01); *B60G 2500/2042* (2013.01)

(58) Field of Classification Search
CPC .............. B60G 17/0424; B60G 17/056; B60G 2202/154; B60G 2400/60;
(Continued)

(56) References Cited

U.S. PATENT DOCUMENTS 3,575,253 A 4/1971 Brumm
3,628,810 A 12/1971 Graef
(Continued)

OTHER PUBLICATIONS

International Search Report and Written Opinion for Application No. PCT/US2023/032733, mailed Dec. 18, 2023, 14 pages.

*Primary Examiner* — Paul N Dickson
(74) *Attorney, Agent, or Firm* — Womble Bond Dickinson (US) LLP

(57) ABSTRACT

A suspension system configured to exhibit low variance in vehicle ride frequency over a large range of vehicle loads. The suspension system includes a strut having a cylinder and a piston configured to reciprocate in the cylinder. The suspension system also includes a vessel coupled to the strut, and a valve in an interior chamber of the vessel. The valve divides the interior chamber into a first liquid volume and a second liquid volume. The suspension system also includes a hydraulic accumulator having a volume and a liquid volume. The suspension system further includes a compressible liquid in the cylinder, the first liquid volume in the vessel, and the second liquid volume in the vessel, and a spring element in the volume of the hydraulic accumulator.

12 Claims, 3 Drawing Sheets

Related U.S. Application Data

No. 17/936,087, filed on Sep. 28, 2022, now Pat. No. 11,738,619.

(58) Field of Classification Search
CPC ........ B60G 2500/2042; B60G 17/0416; B60G 17/0408; B60G 17/08
See application file for complete search history.

(56) References Cited

U.S. PATENT DOCUMENTS

| | | | |
|---|---|---|---|
| 3,947,004 A * | 3/1976 | Taylor | F16F 5/00 267/64.13 |
| 3,954,255 A | 5/1976 | Keijzer et al. | |
| 4,153,237 A | 5/1979 | Supalla | |
| 4,260,177 A | 4/1981 | Pflughaupt et al. | |
| RE31,184 E | 3/1983 | Lederman | |
| 4,443,926 A | 4/1984 | Pearson et al. | |
| 4,474,363 A | 10/1984 | Numazawa et al. | |
| 4,491,207 A | 1/1985 | Boonchanta et al. | |
| 4,602,707 A | 7/1986 | Zumwinkel et al. | |
| 4,706,769 A | 11/1987 | Latourelle et al. | |
| 4,756,517 A | 7/1988 | Kakimoto | |
| 4,767,134 A | 8/1988 | Booher | |
| 4,798,400 A | 1/1989 | Kosuge | |
| 4,838,563 A | 6/1989 | Konishi et al. | |
| 4,872,702 A | 10/1989 | Medley | |
| 4,936,424 A * | 6/1990 | Costa | F16F 9/064 267/64.22 |
| 4,958,706 A | 9/1990 | Richardson et al. | |
| 5,031,732 A | 7/1991 | Batek et al. | |
| 5,152,379 A | 10/1992 | Sackett et al. | |
| 5,152,547 A | 10/1992 | Davis | |
| 5,195,772 A | 3/1993 | Bachrach et al. | |
| 5,219,152 A * | 6/1993 | Derrien | F16F 9/56 280/43.23 |
| 5,220,983 A | 6/1993 | Furrer et al. | |
| 5,301,974 A | 4/1994 | Knapp | |
| 5,458,218 A * | 10/1995 | Runkel | B60G 21/10 280/124.16 |
| 6,161,821 A * | 12/2000 | Leno | B60G 17/0416 188/322.19 |
| 6,213,263 B1 | 4/2001 | De Frenne | |
| 6,311,961 B1 | 11/2001 | Julia | |
| 6,318,525 B1 * | 11/2001 | Vignocchi | F16F 9/096 188/266.6 |
| 7,374,028 B2 | 5/2008 | Fox | |
| 2002/0195789 A1 | 12/2002 | Coombs et al. | |
| 2003/0075882 A1 | 4/2003 | Delorenzis et al. | |
| 2004/0256186 A1 * | 12/2004 | Farewell | F16F 9/096 188/314 |
| 2005/0173213 A1 | 8/2005 | Coquet | |
| 2006/0027954 A1 | 2/2006 | Nesbitt et al. | |
| 2006/0186728 A1 | 8/2006 | Mizuta et al. | |
| 2012/0098215 A1 * | 4/2012 | Rositch | F04B 43/073 280/6.157 |
| 2013/0144489 A1 | 6/2013 | Galasso et al. | |

* cited by examiner

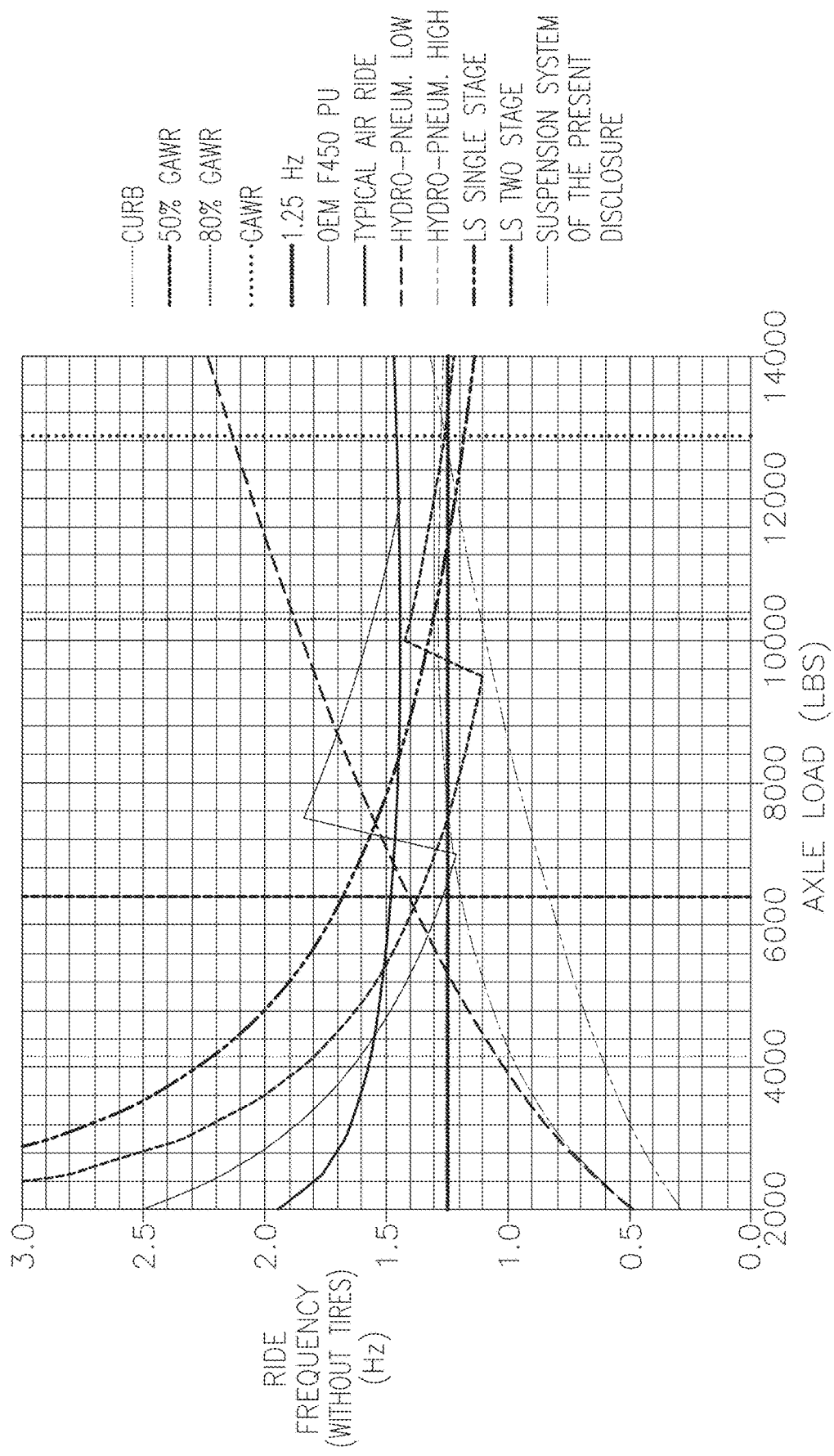

VARIABLE RATE LIQUID SPRING SUSPENSION SYSTEM EXHIBITING LOW VARIANCE IN SUSPENSION FREQUENCY

CROSS-REFERENCE TO RELATED APPLICATION(S)

This application is a continuation of U.S. patent application Ser. No. 18/334,878, filed Jun. 14, 2023, which is a continuation of U.S. patent application Ser. No. 17/936,087, filed Sep. 28, 2022, now U.S. Pat. No. 11,738,619, the entire contents of which are incorporated herein by reference.

BACKGROUND

1. Field

The present disclosure relates to suspension systems that exhibit low variance in suspension frequency.

2. Description of the Related Art

A variety of different types of vehicle suspension systems exist, including leaf spring suspensions, hydraulic suspensions, and air suspensions. However, when a vehicle is equipped with these conventional suspension systems, the ride frequency of the vehicle will vary widely over a wide range of different vehicle loads. Additionally, vehicles equipped with these conventional suspension systems may exhibit an ideal or near-ideal ride frequency only at a narrow range of vehicle loads, such as near curb weight or near 100% gross axle weight rating (GAWR). Accordingly, vehicles equipped with these conventional suspension systems may experience harsh, stiff ride conditions under some load conditions of the vehicle and soft ride conditions under other load conditions.

SUMMARY

The present disclosure relates to various embodiments of a suspension system configured to exhibit low variance in vehicle ride frequency over a large range of vehicle loads. In one embodiment, the suspension system includes a strut having a cylinder and a piston configured to reciprocate in the cylinder. The suspension system also includes a vessel coupled to the strut, and a valve in an interior chamber of the vessel. The valve divides the interior chamber into a first liquid volume and a second liquid volume. The suspension system also includes a hydraulic accumulator having a volume and a liquid volume. The suspension system further includes a compressible liquid in the cylinder, the first liquid volume in the vessel, and the second liquid volume in the vessel, and a spring element in the volume of the hydraulic accumulator.

A first spring function exhibited by the compressible liquid in the cylinder, the first liquid volume, and the second liquid volume may be in series with a second spring function exhibited by the spring element in the hydraulic accumulator.

The hydraulic accumulator may be a floating-piston type accumulator including a floating piston in the vessel, and the liquid volume of the floating-piston type accumulator may be the first liquid volume of the vessel.

The hydraulic accumulator may be a bladder-type accumulator including a bladder separating the volume from the liquid volume, and the liquid volume of the bladder-type accumulator may be separate from the first liquid volume of the vessel.

The valve may be configured to move between an open configuration in which the compressible liquid in the cylinder is in fluid communication with the compressible liquid in the second liquid volume in the vessel, and a closed configuration in which the compressible liquid in the cylinder is isolated from the compressible liquid in the second liquid volume. The valve may be further configured to move into a partially closed configuration.

The hydraulic accumulator may be remote from the strut and the vessel.

The spring element in the volume of the hydraulic accumulator may include gas.

The gas in the hydraulic accumulator may be nitrogen, and the nitrogen gas may be pressurized.

The suspension system may also include a gas fill valve coupled to the hydraulic accumulator and in communication with the volume.

The spring element in the volume of the hydraulic accumulator may be a gas, a compressible liquid, a mechanical spring element, or combinations thereof.

In an embodiment in which the spring element includes compressible liquid, the compressible liquid of the spring element is more compressible than the compressible liquid in the cylinder, the first liquid volume in the vessel, and the second liquid volume in the vessel.

In an embodiment in which the spring element includes compressible liquid, the compressible liquid of the spring element and the compressible liquid in the cylinder, the first liquid volume in the vessel, and the second liquid volume in the vessel may both be silicone oil.

The present disclosure also relates to various embodiments of a vehicle incorporating a suspension system configured to cause the vehicle to exhibit low variance in vehicle ride frequency over a large range of vehicle loads.

The suspension system may cause the vehicle to exhibit a ride frequency within approximately 8% of a desired ride frequency over a range of weights ranging from 50% of a gross axle weight rating (GAWR) of the vehicle to 80% of the GAWR of the vehicle.

The ride frequency may be within approximately 5% of the desired ride frequency over the range of weights ranging from 50% GAWR of the vehicle to 80% of the GAWR of the vehicle.

The ride frequency may be within approximately 3% of the desired ride frequency over the range of weights ranging from 50% GAWR of the vehicle to 80% of the GAWR of the vehicle.

The desired ride frequency may be a constant in a range from approximately 1 Hz to approximately 1.3 Hz.

The suspension system may be configured to cause the ride frequency to increase non-linearly with increasing weight of the vehicle.

The suspension system may cause the ride frequency to increase continuously from curb weight to 50% GAWR of the vehicle.

The suspension system may cause the ride frequency of the vehicle to be approximately 1 Hz at curb weight of the vehicle.

The suspension system may cause the ride frequency of the vehicle to be approximately 1.3 Hz at 80% GAWR of the vehicle.

The suspension system may cause the ride frequency of the vehicle to be approximately 1.25 Hz at 100% GAWR of the vehicle.

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable suspension system with low ride frequency variance when the vehicle is subjected to a wide load variance.

BRIEF DESCRIPTION OF THE DRAWINGS

The features and advantages of embodiments of the present disclosure will be better understood by reference to the following detailed description when considered in conjunction with the drawings. The drawings are not necessarily drawn to scale.

FIG. 3 is a graph depicting the ride frequency as a function of axle load for the suspension systems of the present disclosure compared to various related art suspension systems.

DETAILED DESCRIPTION

The present disclosure relates to various embodiments of a suspension system that is configured to exhibit low variance in ride frequency over a range of different load (weight) conditions of the vehicle on which the suspension system is equipped. In one or more embodiments, the suspension system incorporates a hydraulic accumulator utilizing compressible liquid and gas coupled as a series spring with a compressible liquid spring system such that the spring rate of the suspension system increases proportionally (or substantially proportionally) to the increase in the weight of the vehicle.

Figure 1:
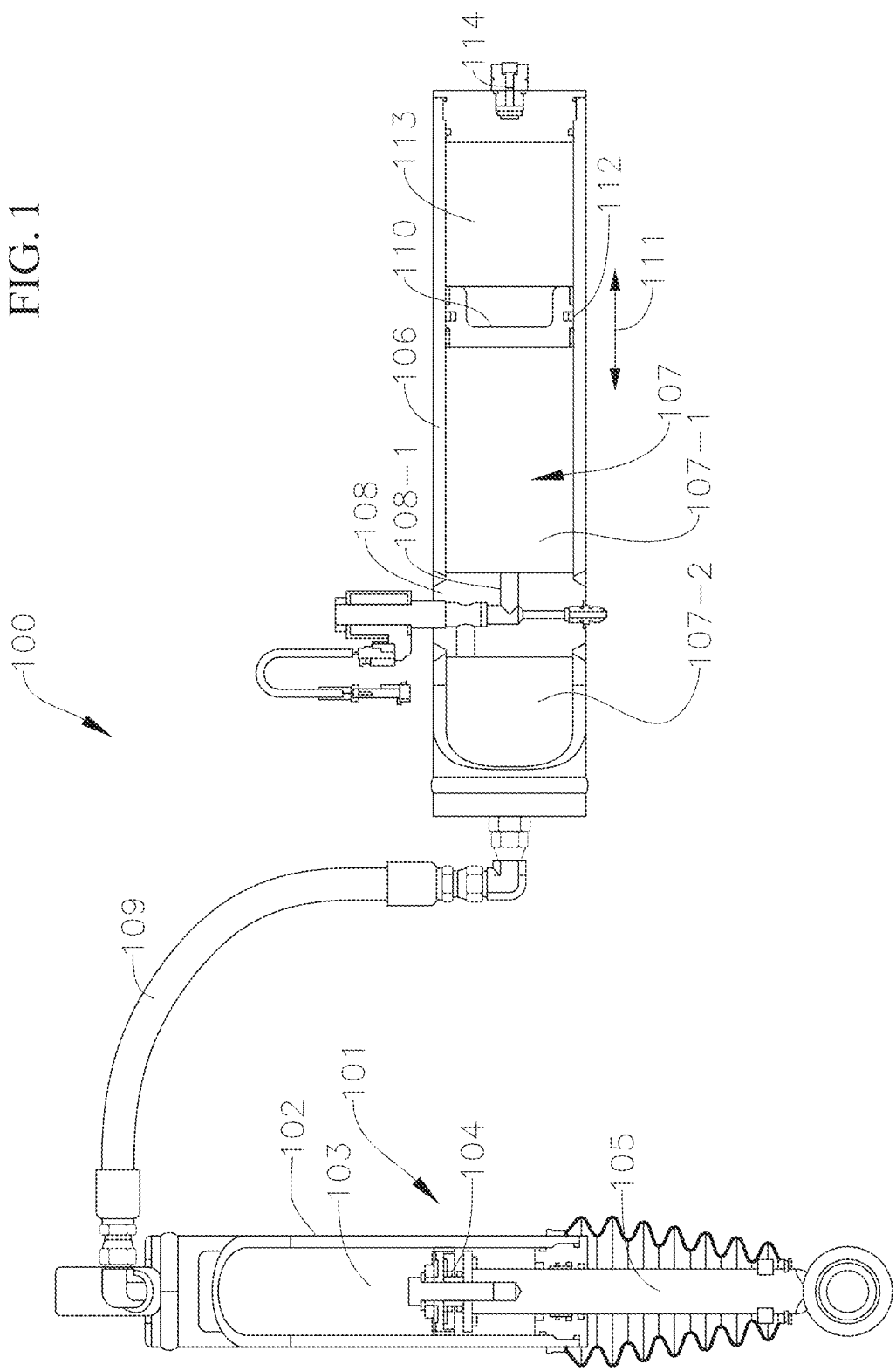
FIG. 1 is a schematic view of a suspension system according to one embodiment of the present disclosure.

With reference now to FIG. 1, a suspension system 100 according to one embodiment of the present disclosure includes a strut 101 including a cylinder 102 defining an interior chamber 103, a piston 104 reciprocally movable within the interior chamber 103 of the cylinder 102, and a connecting rod 105 coupled to the piston 104. The outside diameter of piston 104 forms a seal with an interior surface of the cylinder 102, and piston 104 may have, in one or more embodiments, passageways allowing compressible fluid pressure to be equalized between upper and lower chambers of cylinder 102 separated by piston 104. When the suspension system 100 is installed on a vehicle, the connecting rod 105 is coupled to a wheel of the vehicle and cylinder 102 is connected to the vehicle frame. In the illustrated embodiment, the suspension system 100 also includes a vessel 106 coupled to the strut 101. The vessel 106 defines interior chambers or volumes 107 and 113. The suspension system 100 also includes a manifold 108 with valve 108-1 (e.g., a rate valve) separating interior chamber 107 into two sub-chambers of the vessel 106. The manifold 108 divides or segments the interior chamber 107 of the vessel 106 into a first liquid volume 107-1 and a second liquid volume 107-2 (i.e., the first and second liquid volumes 107-1 and 107-2 are on opposite sides of the manifold 108). The first liquid volume 107-1, the second liquid volume 107-2, and the interior chamber 103 of the cylinder 102 contain a compressible liquid, and the compressible liquid in the cylinder 102 is in communication with the compressible liquid in the second liquid volume 107-2 via a hose or other suitable conduit 109. In one or more embodiments, the compressible liquid may be silicone oil.

The valve 108-1 is configured to move between an open configuration, a partially open (i.e., partially closed) configuration, and a fully closed configuration. In the open configuration and the partially open configuration, the compressible liquid in the interior chamber 103 of the cylinder 102 and in the second liquid volume 107-2 of the vessel 106 are in communication with the compressible liquid in the first liquid volume 107-1 of the vessel 106. When the valve 108-1 is in the fully closed configuration, the compressible liquid in the interior chamber 103 of the cylinder 102 and in the second liquid volume 107-2 of the vessel 106 is isolated from the compressible liquid in the first liquid volume 107-1 of the vessel 106.

As used herein, the terms "fluid", "in communication", and "isolated" are used to describe various concepts and relationships of the invention. The word "fluid" refers to the substance contained within the components, for example, a liquid or a gas. The words "in communication" mean that the fluid is allowed to flow between the relevant components or volumes defined by the components. The word "isolated" means the fluid is prevented from flowing or interacting between the relevant components or volumes. As used herein, the term "compressible liquid" refers to a liquid having a compression greater than approximately 2.0% at approximately 4000 psi, and "non-compressible liquid" refers to a liquid having a compression less than or equal to approximately 2.0% at approximately 4000 psi. For example, mineral oil utilized in conventional liquid suspension systems is a non-compressible liquid for purposes of the present disclosure.

Additionally, in the illustrated embodiment, the suspension system 100 includes a floating piston 110 in the interior chamber 107 of the vessel 106. The floating piston 110 is configured to oscillate (arrow 111) within the interior chamber 107 (i.e., move to the left and to the right in FIG. 1) in response to pressure fluctuations in the compressible liquid due to load changes on the strut 101 caused by vehicle payload and/or dynamic road inputs to the vehicle equipped with the suspension system 100. The floating piston 110 also includes a piston seal 112 to form a fluid-tight seal between the floating piston 110 and an interior wall of the vessel 106.

The floating piston 110 isolates the first liquid volume 107-1 of the vessel 106, which contains the compressible liquid, from a volume 113 (i.e., the first liquid volume 107-1 and the volume 113 are isolated from each other on opposite sides of the floating piston 110). In one or more embodiments, the volume 113 may include a gas (e.g., nitrogen), a compressible liquid (e.g., silicone oil), one or more mechanical spring elements (e.g., one or more spring coils), and/or any other suitable element exhibiting a spring function. In one or more embodiments in which the volume 113 contains a compressible liquid, the compressible liquid in the volume 113 may be more compressible than the compressible liquid in the interior chamber 103 of the cylinder 102 and the first and second liquid volumes 107-1 and 107-2 of the vessel 106. Additionally, in one or more embodiments, the compressible liquid in the volume 113 and the compressible liquid in the interior chamber 103 of the cylinder 102 and the first and second liquid volumes 107-1 and 107-2 of the vessel 106 may be the same kind of compressible liquid or different kinds of compressible liquids. For instance, in one or more embodiments, the compressible liquid in the volume 113 and the compressible liquid in the interior chamber 103 of the cylinder 102 and the first and second liquid volumes 107-1 and 107-2 of the vessel 106 may both be the same kind of compressible liquid, such as silicone oil, but the compressibility of the silicone oil in the volume 113 is greater than the compressibility of the silicone oil in the interior chamber 103 of the cylinder 102 and the first and second liquid volumes 107-1 and 107-2 of the vessel 106. In one or more embodiments in which the volume 113 includes a gas, the vessel 106 also includes a gas fill valve 114 in fluid communication with the volume 113. The gas fill valve 114 enables the volume 113 to be filled with a gas (e.g., nitrogen) and pressurized to the predetermined pressure based on the desired spring rate performance characteristics of the suspension system 100, described in more detail below. Moreover, as described in more detail below, the first liquid volume 107-1, the floating piston 110, and the volume 113 together function as a floating-piston type hydraulic accumulator.

In operation, the position of the valve 108-1 may be selected depending on the desired spring stiffness of the suspension system 100. When valve 108-1 is open, the compressible liquid in the interior chamber 103 of the cylinder 102 and the second liquid volume 107-2 are in communication with the compressible liquid in the first liquid volume 107-1 such that the effective volume of the compressible liquid in the suspension system 100 is equal to the combined volume of the compressible liquid in the interior chamber 103 of the cylinder 102, the first liquid volume 107-1, and the second liquid volume 107-2. Thus, when the valve 108-1 is open, the relatively large effective volume of compressible liquid in the suspension system 100 provides a base spring stiffness dependent upon fluid pressure (due to static axle loading). When valve 108-1 is closed, the compressible liquid in the interior chamber 103 of the cylinder 102 and the second liquid volume 107-2 are isolated from the compressible liquid in the first liquid volume 107-1 such that the effective volume of the compressible liquid in the suspension system 100 is equal to the combined volume of the compressible liquid in the interior chamber 103 of the cylinder 102 and in the second liquid volume 107-2. Thus, when the valve 108 is closed, the relatively smaller effective volume of compressible liquid in the suspension system 100 provides a spring stiffness relatively higher than the base spring stiffness. Accordingly, the valve 108 may be set in the open position to achieve a base spring stiffness, or the valve 108 may be set in the closed position to achieve a relatively higher spring stiffness. In one or more embodiments, the position of valve 108-1 may be set based on a variety of dynamic conditions or parameters of the vehicle, such as vehicle speed, steering wheel position/velocity, and/or body roll.

Additionally, in operation when valve 108-1 is in the open position, the compressible liquid in the interior chamber 103 of the cylinder 102, the first liquid volume 107-1, and the second liquid volume 107-2, and the gas (e.g., nitrogen), the compressible liquid, and/or the mechanical spring element in the volume 113 function as springs in series (i.e., the compressibility of the effective volume of the compressible liquid functions as a first spring, and the compressibility of the gas, the compressible liquid, and/or the mechanical spring element in the volume 113 functions as a second spring in series with the first spring). Additionally, when the vehicle to which the suspension system 100 is incorporated is operating at a relatively low load (e.g., curb weight up to approximately 20% gross axle weight rating (GAWR)), the spring provided by the volume 113 tends to provide the predominant spring function of the suspension system 100. Accordingly, due to the relatively high compressibility of the gas (e.g., nitrogen), the compressible liquid, and/or the mechanical spring element in the volume 113, the suspension system 100 has a relatively low spring rate at relatively low vehicle loads. When the valve 108 is in the closed state, the spring function exhibited by the suspension system 100 is attributed to the compressible liquid only, not the gas, the compressible liquid, and/or the mechanical spring element in the volume 113. That is, when the valve 108 is in the closed state, the spring stiffness of the suspension system 100 is a function of the compressibility of the compressible liquid in the interior chamber 103 of the cylinder 102 and the second liquid volume 107-2.

Furthermore, the spring rate of the suspension system 100 is governed by the compressibility of the compressible liquid, which increases as the pressure of the compressible liquid is increased in the suspension system 100 (i.e., the compressibility of the compressible liquid increases with increasing pressure). Thus, the changing liquid compressibility, due to fluid pressure changes, results in a changing spring rate for changing load conditions of the vehicle into which the suspension system 100 is incorporated.

As shown in Equation 1 below, the ride frequency (f) of the vehicle in hertz (Hz) is directly proportional to the spring rate, K, and inversely proportional to the sprung mass, M, of the vehicle:

$$f = \left(\frac{1}{2\pi}\right)\sqrt{K/M} \qquad \text{(Equation 1)}$$

When the sprung mass M of the vehicle (i.e., the axle load of the vehicle) is relatively low, the spring function of the suspension system 100 is governed predominately by the compressibility of the gas, the compressible liquid, and/or the mechanical spring element in the volume 113, and thus the spring rate K of the vehicle is proportionally relatively low due to the high compressibility of the gas (e.g., nitrogen), the compressible liquid, and/or the mechanical spring element. As the sprung mass M of the vehicle increases, the spring function of the suspension system 100 is governed more by the compressibility of the compressible liquid (e.g., the compressible liquid in the interior chamber 103 of the cylinder 102, the first liquid volume 107-1, and the second liquid volume 107-2) than by the compressibility of the gas, the compressible liquid, and/or the mechanical spring element in the volume 113. Accordingly, due to the relatively large volume of the compressible liquid in the suspension system 100, the spring rate K of the vehicle increases proportionally (or substantially proportionally) as the sprung mass M of the vehicle increases. Additionally, as the sprung mass M of the vehicle increases even further, the compressibility of the compressible liquid increases, which increases the spring rate K of the vehicle proportionally (or substantially proportionally) as the sprung mass M of the vehicle increases. As shown in Equation 1 above, increasing the spring rate K proportional (or substantially proportional) to the increase in the sprung mass M of the vehicle is configured to maintain a constant (or substantially constant) ride frequency f of the vehicle. In this manner, the spring rate of the suspension system 100 is variable such that the increase of the spring rate K of the suspension system 100 is configured to offset (or substantially offset) the effect that the increasing vehicle load would otherwise have on the ride frequency such that the vehicle exhibits a constant (or substantially constant) ride frequency over a wide range of load conditions of the vehicle.

Figure 2:
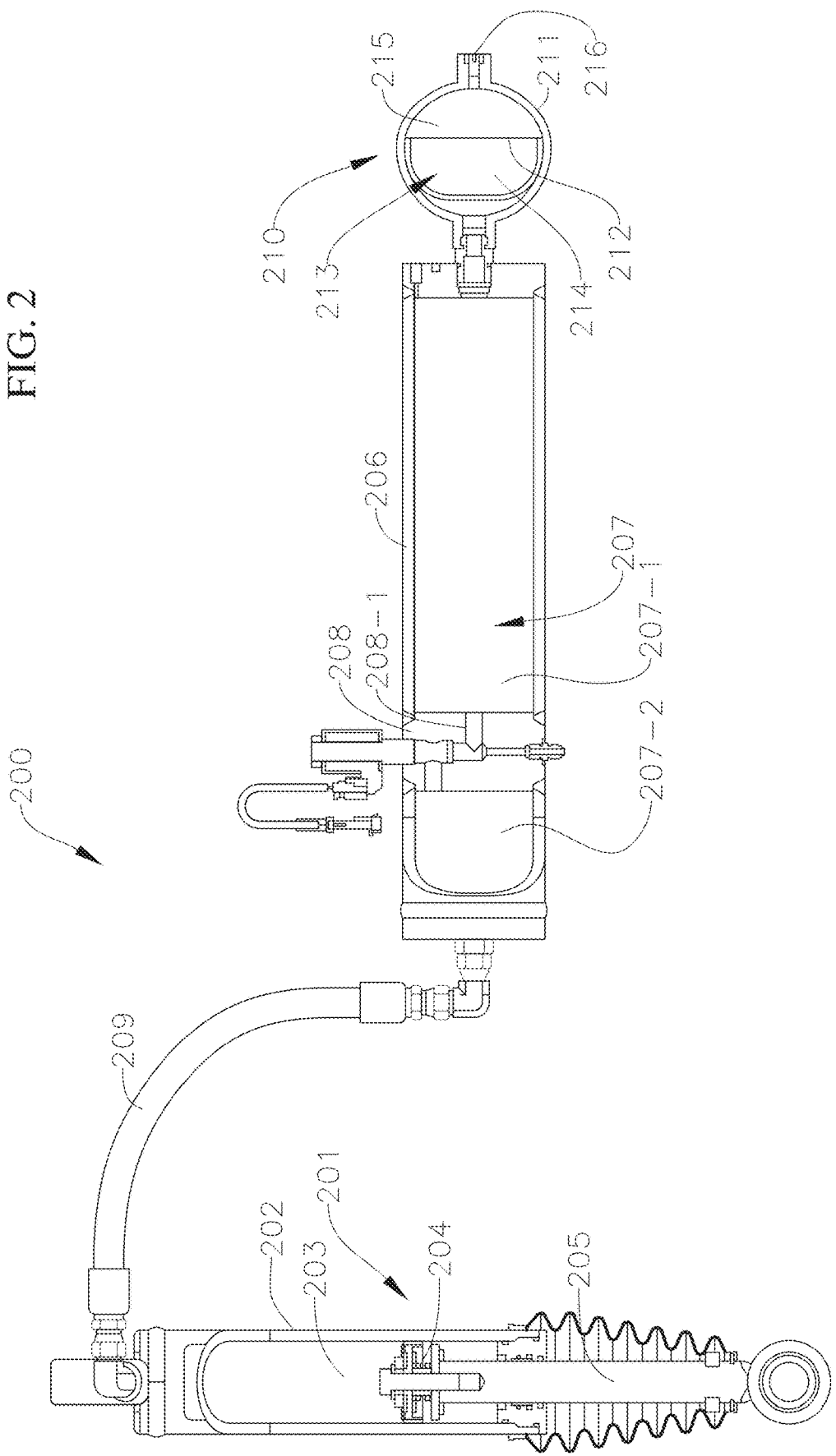
FIG. 2 a schematic view of a suspension system according to another embodiment of the present disclosure.

FIG. 2 depicts a suspension system according to another embodiment of the present disclosure. The suspension system 200 according to the embodiment illustrated in FIG. 2 is similar to the embodiment of the suspension system 100 illustrated in FIG. 1 except the hydraulic accumulator is a bladder-type accumulator rather than a floating piston-type accumulator.

In the illustrated embodiment, the suspension system 200 includes a strut 201 including a cylinder 202 defining an interior chamber 203, a piston 204 reciprocally movable within the interior chamber 203 of the cylinder 202, and a connecting rod 205 coupled to the piston 204. The outside diameter of piston 204 forms a seal with an interior surface of the cylinder 202, and piston 204 may have, in one or more embodiments, passageways allowing compressible fluid pressure to be equalized between upper and lower chambers of cylinder 202 separated by piston 204.

In the illustrated embodiment, the suspension system 200 also includes a vessel 206 coupled to the strut 201. The vessel 206 defines interior chambers or volumes 207 and 213. The suspension system 200 also includes a manifold 208 with valve 208-1 (e.g., a rate valve) separating interior chamber 207 of the vessel 206 into two sub-chambers. Manifold 208 divides or segments the interior chamber 207 of the vessel 206 into a first liquid volume 207-1 and a second liquid volume 207-2 (i.e., the first and second liquid volumes 207-1 and 207-2 are on opposite sides of the manifold 208). The first liquid volume 207-1, the second liquid volume 207-2, and the interior chamber 203 of the cylinder 202 contain a compressible liquid, and the compressible liquid in the cylinder 202 is in communication with the compressible liquid in the second liquid volume 207-2 via a hose or other suitable conduit 209. In one or more embodiments, the compressible liquid may be silicone oil.

In the illustrated embodiment, the suspension system 200 also includes a bladder-type hydraulic accumulator 210 coupled to the vessel 206. The bladder-type hydraulic accumulator 210 includes a rigid sphere 211 (e.g., a steel sphere) and a bladder or diaphragm 212 separating an interior 213 of the sphere 211 into a liquid chamber 214 and a chamber 215 (i.e., the liquid chamber 214 and the chamber 215 are on opposite sides of the bladder 212 in the bladder-type hydraulic accumulator 210). The liquid chamber 214 of the bladder-type hydraulic accumulator 210 is in fluid communication with the first liquid volume 207-1 in the vessel 206, and the chamber 215 of the bladder-type hydraulic accumulator 210 is isolated from the first liquid volume 207-1 in the vessel 206 by the bladder 212. In one or more embodiments, the chamber 215 may include a gas (e.g., nitrogen), a compressible liquid (e.g., silicone oil), one or more mechanical spring elements (e.g., one or more spring coils), and/or any other suitable element exhibiting a spring function. In one or more embodiments in which the chamber 215 contains a compressible liquid, the compressible liquid in the chamber 215 may be more compressible than the compressible liquid in the interior chamber 203 of the cylinder 202 and in the first and second liquid volumes 207-1 and 207-2 of the vessel 206. Additionally, in one or more embodiments, the compressible liquid in the chamber 215 and the compressible liquid in the interior chamber 203 of the cylinder 202 and in the first and second liquid volumes 207-1 and 207-2 of the vessel 206 may be the same kind of compressible liquid or different kinds of compressible liquids. For instance, in one or more embodiments, the compressible liquid in the chamber 215 and the compressible liquid in the interior chamber 203 of the cylinder 202 and in the first and second liquid volumes 207-1 and 207-2 of the vessel 206 may both be the same kind of compressible liquid, such as silicone oil, but the compressibility of the silicone oil in the chamber 215 is greater than the compressibility of the silicone oil in the interior chamber 203 of the cylinder 202 and in the first and second liquid volumes 207-1 and 207-2 of the vessel 206. In one or more embodiments in which the chamber 215 includes a gas, the bladder-type hydraulic accumulator 210 also includes a gas fill valve 216 coupled to the sphere 211 and in selective fluid communication with the chamber 215. The gas fill valve 216 enables the chamber 215 of the bladder-type accumulator 210 to be filled with a gas (e.g., nitrogen) and pressurized to the predetermined pressure based on the desired spring rate performance characteristics of the suspension system 200, described in more detail below.

In one or more embodiments, the hydraulic accumulator may have any other suitable configuration. For example, in one or more embodiments, the hydraulic accumulator may be remote from the strut and the vessel.

FIG. 3 is a graph depicting the ride frequency as a function of axle load for the suspension systems of the present disclosure compared to various related art suspension systems. As illustrated in FIG. 3, the ride frequency of a vehicle incorporating a suspension system according to one embodiment of the present disclosure is approximately 1.0 Hz when the vehicle is at curb weight (e.g., approximately 4,200 lbs axle weight) and increases non-linearly to approximately 1.23 Hz at approximately 50% gross axle weight rating (GAWR) (e.g., approximately 6,400 lbs axle weight) and to approximately 1.28 Hz at approximately 80% GAWR (e.g., approximately 10,240 lbs axle weight), and then decreases non-linearly to approximately 1.25 Hz at approximately 100% GAWR (e.g., approximately 12,800 lbs axle weight). Accordingly, the vehicle incorporating the suspension system of the present disclosure maintains a substantially constant ride frequency across a range of vehicle weights. For instance, as illustrated in FIG. 3, the vehicle incorporating the suspension system of the present disclosure exhibits a ride frequency within approximately ±2.5% of 1.25 Hz (e.g., approximately 1.23 Hz to approximately 1.28 Hz) over a range from approximately 50% GAWR (6,400 lbs axle weight) to approximately 80% GAWR (e.g., approximately 10,240 lbs axle weight). Additionally, as illustrated in FIG. 3, the vehicle incorporating the suspension system of the present disclosure also exhibits a ride frequency within approximately ±2.5% of 1.25 Hz over a range from approximately 50% GAWR (e.g., approximately 6,400 lbs axle weight) to approximately 100% GAWR (e.g., approximately 12,800 lbs axle weight). Furthermore, as illustrated in FIG. 3, the vehicle incorporating the suspension system of the present disclosure exhibits a ride frequency within approximately +2.5% of 1.25 Hz (e.g., approximately 1.28 Hz to approximately 1.25 Hz) over a range from approximately 80% GAWR (e.g., approximately 10,240 lbs axle weight) to approximately 100% GAWR (e.g., approximately 12,800 lbs axle weight).

In one or more embodiments, a vehicle incorporating a suspension system according to embodiments of the present disclosure (e.g., suspension system 100 or 200) exhibits a constant (or substantially constant) ride frequency that optimizes or maximizes rider comfort, such as from approximately 1 Hz to approximately 1.3 Hz, or from approximately 1.1 Hz to approximately 1.25 Hz, or from approximately 1.1 Hz to approximately 1.2 Hz. In one or more embodiments, a vehicle incorporating a suspension system of the present disclosure may exhibit a ride frequency that remains within approximately 8% (i.e., +/−8%) of a constant ride frequency within a range from 1 Hz to 1.3 Hz over a range from approximately 50% GAWR (e.g., approximately 6,400 lbs axle weight) to approximately 80% GAWR (e.g., approximately 10,2400 lbs axle weight). For instance, in one or more embodiments, the vehicle incorporating a suspension system of the present disclosure may exhibit a ride frequency within +/−8% of approximately 1.25 Hz over a range from approximately 50% GAWR (e.g., approximately 6,400 lbs axle weight) to approximately 80% GAWR (e.g., approximately 10,240 lbs axle weight) of the vehicle. In one or more embodiments, a vehicle incorporating a suspension system of the present disclosure may exhibit a ride frequency that is within less than approximately 8% (e.g., approximately 7%, approximately 6%, approximately 5%, approximately 4%, approximately 3%, approximately 2%, or approximately 1% or less) of a constant ride frequency within a range from 1 Hz to 1.3 Hz over a range from approximately 50% GAWR (e.g., approximately 6,400 lbs axle weight) to approximately 80% GAWR (e.g., approximately 10,240 lbs axle weight).

In contrast, as illustrated in FIG. 3, vehicles incorporating conventional air spring suspension systems exhibit a ride frequency that decreases non-linearly from a ride frequency of approximately 1.55 Hz at curb weight to approximately 1.45 Hz at 80% GAWR and 100% GAWR. Although the conventional air spring suspension system exhibits a ride frequency that is generally constant over a range of vehicle weights, the ride frequency is in a range from approximately 1.45 Hz to approximately 1.5 Hz, which is greater than an ideal ride frequency in a range from approximately 1.0 Hz to approximately 1.2 Hz. Additionally, conventional air spring suspension systems cannot reduce their spring rate further to achiever a lower ride frequency due to body control needs of the vehicle.

Furthermore, as illustrated in FIG. 3, conventional hydropneumatic strut suspension systems, which typically include a gaseous element or accumulator coupled to a piston-cylinder arrangement including a non-compressible liquid (e.g., mineral oil), have ride frequencies that vary greatly over large changes in vehicle weight. In conventional hydropneumatic strut suspension systems, the spring rate is governed solely by the compressibility of the gas, and the pressurization of the gas may be varied. FIG. 3 depicts the performance characteristics of a conventional hydro-pneumatic suspension system in which the gas is pressurized to a relatively low pressure and in which the gas is pressurized to a relatively high pressure. As illustrated in FIG. 3, a conventional hydro-pneumatic suspension system having a relatively high gas pressurization exhibits a ride frequency that varies from approximately 0.6 Hz at curb weight, to approximately 1.1 Hz at 80% GAWR, and approximately 1.25 Hz at 100% GAWR. A conventional hydro-pneumatic suspension system having a relatively low gas pressurization exhibits a ride frequency that varies from approximately 1.05 Hz at curb weight, to approximately 1.88 Hz at 80% GAWR, and to approximately 2.14 Hz at 100% GAWR. Accordingly, both the relatively low gas pressure and the relatively high gas pressure hydro-pneumatic suspension systems achieve the desired ride frequency (e.g., approximately 1.25 Hz) only at a single vehicle weight (e.g., at approximately 100% GAWR for the high gas pressure hydro-pneumatic suspension, and at approximately 15% GAWR for the low gas pressure hydro-pneumatic suspension) and either exceed or fall below the desired ride frequency at every other weight.

FIG. 3 also depicts the performance characteristics of a conventional rear multistage leaf spring suspension. In a conventional multistage leaf spring suspension system, only a first leaf spring is engaged at relatively lighter payloads and then the first leaf spring and a second leaf spring are engaged as the payload increases. As illustrated in FIG. 3, the ride frequency of a vehicle including a conventional multistage leaf spring suspension exhibits a ride frequency of approximately 1.6 Hz at curb weight and decreases to approximately 1.2 Hz at approximately 37% GAWR. The ride frequency then abruptly increases (due to the engagement of the next "stage" of the multistage leaf spring system) to approximately 1.85 Hz and then decreases to approximately 1.55 Hz at 80% GAWR.

FIG. 3 further depicts the performance characteristics of a vehicle including conventional liquid-type springs that utilize a compressible liquid that performs the spring function. The spring rate of a compressible liquid type spring is governed by the compressibility of the liquid which increases as fluid pressure is increased in a constant volume configuration. The changing liquid compressibility, due to fluid pressure changes, results in a changing spring rate (i.e., compressible liquid exhibits a changing spring rate for changing load conditions) and thus reduced variance in ride frequency. As illustrated in FIG. 3, a vehicle incorporating a single stage liquid-type spring (i.e., a single, fixed volume of compressible liquid) exhibits a spring rate of approximately 2.2 Hz at curb weight and decreases to approximately 1.3 Hz at 80% GAWR and approximately 1.18 Hz at 100% GAWR. Additionally, as illustrated in FIG. 3, a vehicle incorporating a two-stage liquid-type spring (i.e., two volumes of compressible liquid that may be selectively connected to, or disconnected from, each other to increase or decrease the effective volume of compressible liquid in the system) exhibits a ride frequency of approximately 1.8 Hz at curb weight and approximately 1.1 Hz at approximately 70% GAWR, when the two volumes of compressible liquid are in communication with each other. When the valve is closed such that the two volumes of compressible liquid are no longer in communication with each other (i.e., the effective volume of compressible liquid in the system is limited to the amount of compressible liquid in the first volume), the ride frequency of the vehicle abruptly increases to 1.4 Hz and then decreases to approximately 1.3 Hz at 80% GAWR and approximately 1.18 Hz at 100% GAWR.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is referred to as being "coupled" or "connected" to another component, it can be directly attached to the other component or intervening components may be present therebetween.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

What is claimed is:

1. A suspension system configured to exhibit low variance in ride frequency over a range of load conditions, the suspension system comprising:
   a strut comprising:
   a cylinder; and
   a piston configured to reciprocate in the cylinder;
      a vessel coupled to the strut, the vessel defining an interior chamber;
      a rate valve in the interior chamber of the vessel, the rate valve dividing the interior chamber into a first liquid volume and a second liquid volume;
      a hydraulic accumulator comprising a volume and a liquid volume;
      a compressible liquid in the cylinder, the first liquid volume in the vessel, and the second liquid volume in the vessel; and
      a spring element in the volume of the hydraulic accumulator,
   wherein the rate valve is selected to move between an open configuration in which the compressible liquid in the first liquid volume is in fluid communication with the compressible liquid in the second liquid volume, and a closed configuration in which the compressible liquid in the first liquid volume is isolated from the compressible liquid in the second liquid volume.

2. The suspension system of claim 1, wherein a first spring function exhibited by the compressible liquid in the cylinder, the first liquid volume, and the second liquid volume is in series with a second spring function exhibited by the spring element in the hydraulic accumulator.

3. The suspension system of claim 1, wherein the hydraulic accumulator is a floating-piston type accumulator comprising a floating piston in the vessel, and wherein the liquid volume of the floating-piston type accumulator is the first liquid volume of the vessel.

4. The suspension system of claim 1, wherein the hydraulic accumulator is a bladder-type accumulator comprising a bladder separating the volume from the liquid volume, and wherein the liquid volume of the bladder-type accumulator is separate from the first liquid volume of the vessel.

5. The suspension system of claim 1, wherein the rate valve is selected to further move into a partially closed configuration.

6. The suspension system of claim 1, wherein the hydraulic accumulator is remote from the strut and the vessel.

7. The suspension system of claim 1, wherein the spring element in the volume of the hydraulic accumulator comprises gas.

8. The suspension system of claim 7, wherein the gas is nitrogen.

9. The suspension system of claim 8, wherein the nitrogen is pressurized.

10. The suspension system of claim 7, further comprising a gas fill valve coupled to the hydraulic accumulator and in communication with the volume.

11. The suspension system of claim 1, wherein the spring element in the volume of the hydraulic accumulator is selected from the group consisting of a gas, a compressible liquid, a mechanical spring element, and combinations thereof.

12. A vehicle comprising the suspension system of claim 1.

* * * * *